Jan. 26, 1932.    R. A. A. COUZINET    1,842,859
COMPENSATING DEVICE OF RUDDER AND ELEVATOR CONTROLS OF AIRPLANES
Filed Sept. 15, 1930

R. A. A. Couzinet
INVENTOR

By: Marks & Clerk
ATTYS.

Patented Jan. 26, 1932

1,842,859

UNITED STATES PATENT OFFICE

RENÉ ALEXANDRE ARTHUR COUZINET, OF LEVALLOIS-PERRET, FRANCE

COMPENSATING DEVICE OF RUDDER AND ELEVATOR CONTROLS OF AIRPLANES

Original application filed February 20, 1928, Serial No. 254,558. Divided and this application filed September 15, 1930. Serial No. 482,067, and in France February 26, 1927.

The present invention relates to improvements in the compensating devices of rudder and elevator controls of airplanes and is a division of my prior application No. 254,558, filed February 20, 1928.

These improvements which are more particularly utilisable on airplanes carrying heavy loads, are mainly characterised by the following points applied separately or in combination:

a. The compensation of the stoppage of a side engine is ensured by a secondary rudder, pivoted at the free end of the main rudder; this secondary rudder can be controlled, independently of the main rudder, by any suitable means, but automatically moves in reverse direction to the main rudder when the latter is acted upon.

b. The elevator is provided, at its free ends, with at least one shutter actuated independently of the elevator by any suitable means, but moving automatically and in reverse direction to the elevator when the latter is acted upon; this shutter allows to compensate, during flight, a defective position of the fixed plane.

The accompanying drawings illustrate, by way of example only, a diagrammatic form of construction of a compensating device in accordance with the invention.

Figure 1:
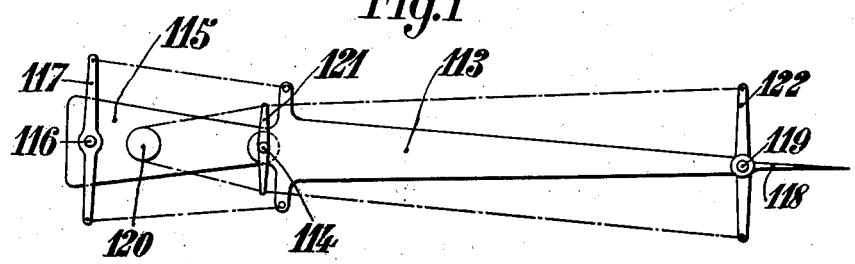
Figures 1, 2 and 3 are diagrammatic plan views of a compensating device.
Figure 2:
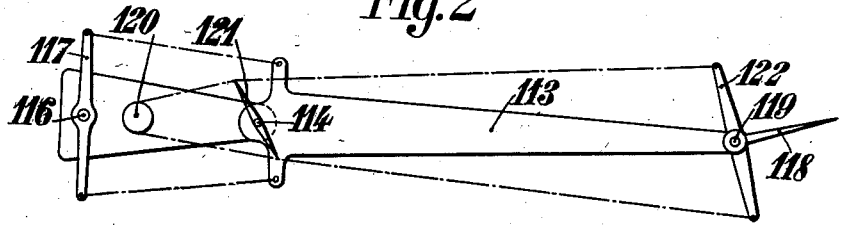
Figure 3:
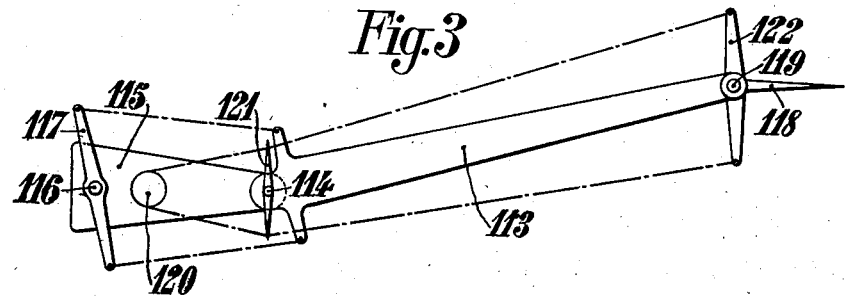

Figures 1, 2 and 3 diagrammatically illustrate a device for compensating the rudder and balancing the airplane in case of stoppage of a side engine. The rudder 113 is pivoted about an axis 114. The member 115 diagrammatically illustrates the fixed part of the airplane on which is pivoted at 116 a rudder bar 117 actuated by the pilot. A second rudder 118 of reduced surface is pivoted at 119 on the free end of the rudder 113. Both axes 114 and 119 are preferably parallel. The second rudder 118 can be actuated, independently of the first one by a control wheel 120 actuated by the pilot. An intermediate rudder bar 121 is interposed between the control wheel 120 and the king-posts 122 of rudder 118. This device operates in the following manner:

When it is desired to compensate the stoppage of one of the side engines without acting on the rudder bar 117, the control wheel 120 is moved so as to bring the rudder 118 in a suitable position laterally balancing the airplane. Such a position is more particularly shown in Fig. 2. When the pilot acts on the rudder bar 117, the main rudder 113 angularly moves about the axis 114 and the secondary rudder 118, owing to its connection with the rudder bar 121 angularly moves about the axis 119, but in reverse direction to the first one, thus ensuring the automatic compensation of the rudder. Such a position is more particularly shown in Fig. 3. The connections between the various rudder bars and king-posts are constituted either by double cables, or by tension and compression tubes.

Figure 4:
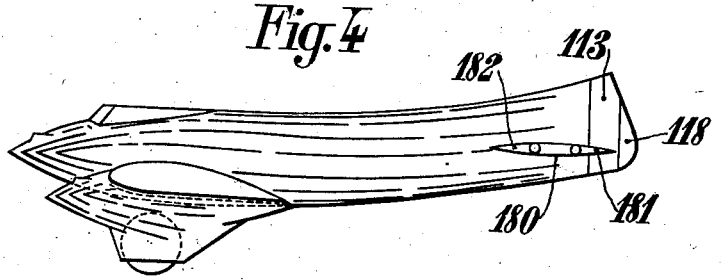
Figure 4 is an elevation of an airplane.

The elevator 180 (Fig. 4) is provided with a flap 181 which avoids the adjustment during the flight, of the fixed plane 182. This device is similar to that previously described for the rudder, and the flap 181 can be actuated in an identical manner with that described for the flap 118.

What I claim as my invention and desire to secure by Letters Patent is:

1. In a steering device for airplanes, a main movable steering plane and means for directly displacing the said main plane, an auxiliary plane pivoted on the said main plane, connections of the parallel motion type for effecting the automatic displacement of the auxiliary plane in an opposite direction to the displacement of the main plane, and means arranged immediately adjacent the displacing means for the steering plane for regulating the position of the parallel motion type connections for permitting an independent regulation of the said auxiliary plane without preventing the compensation usually effected by this auxiliary plane which is always in an opposite direction to the main plane.

2. In a steering device for airplanes, a main movable steering plane, and means for directly displacing said plane, an auxiliary plane on the main plane, connections of the parallel motion type for effecting automatic displacement of the auxiliary displacement of the auxiliary plane in an opposite direction to the displacement of the main plane, said parallel motion connections including an independent auxiliary rudder bar journalled at the axis of the steering plane, king-posts carried by the auxiliary plane, connections between the king-posts and the auxiliary rudder bar, a braked drum under the control of the airplane pilot, and a cable wound on said drum and terminally attached to the auxiliary rudder bar for permitting the independent regulation of said auxiliary plane without preventing the usual compensation effected by this auxiliary plane which is always displaced automatically in an opposite direction to the main plane.

In testimony whereof I have signed this specification.

RENÉ ALEXANDRE ARTHUR COUZINET.